(12) United States Patent
Ohtomo et al.

(10) Patent No.: US 9,954,248 B2
(45) Date of Patent: Apr. 24, 2018

(54) SOLID LITHIUM SECONDARY BATTERY AND METHOD OF MANUFACTURING SAME

(71) Applicant: TOYOTA JIDOSHA KABUSHIKI KAISHA, Toyota-shi, Aichi-ken (JP)

(72) Inventors: Takamasa Ohtomo, Susono (JP); Yuki Kato, Gotenba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 150 days.

(21) Appl. No.: 14/809,695

(22) Filed: Jul. 27, 2015

(65) Prior Publication Data

US 2016/0036091 A1 Feb. 4, 2016

(30) Foreign Application Priority Data

Aug. 4, 2014 (JP) .................................. 2014-158833

(51) Int. Cl.
*H01M 10/05* (2010.01)
*H01M 10/0562* (2010.01)
(Continued)

(52) U.S. Cl.
CPC ..... *H01M 10/0562* (2013.01); *H01M 4/0445* (2013.01); *H01M 4/382* (2013.01);
(Continued)

(58) Field of Classification Search
None
See application file for complete search history.

(56) References Cited

U.S. PATENT DOCUMENTS

| 6,200,706 B1* | 3/2001 | Ashida ................. D04H 1/54 |
| | | 429/247 |
| 2005/0153208 A1* | 7/2005 | Konishiike ............ H01M 4/134 |
| | | 429/245 |

(Continued)

FOREIGN PATENT DOCUMENTS

| JP | 2001-243957 A | 9/2001 |
| JP | 2011-159596 A | 8/2011 |

(Continued)

*Primary Examiner* — Scott J Chmielecki
(74) *Attorney, Agent, or Firm* — Oliff PLC

(57) ABSTRACT

An object of the present invention is to provide a solid lithium secondary battery in which occurrence of short-circuit is suppressed during charging. The object is attained by providing a solid lithium secondary battery comprising an anode current collector, a solid electrolyte layer, a cathode active material layer, and a cathode current collector in this order, wherein the solid electrolyte layer is provided on a surface of the anode current collector, the solid electrolyte layer contains a sulfide solid electrolyte particle, a surface shape of the solid electrolyte layer, which faces the anode current collector, is formed in correspondence with a surface shape of the anode current collector, and 10-point average roughness ($R_z$) of the surface of the anode current collector on a solid electrolyte layer side, and 10-point average roughness ($R_z$) of a surface of the solid electrolyte layer on an anode current collector side are in a range of 1.8 μm to 2.5 μm, respectively.

13 Claims, 5 Drawing Sheets

(51) Int. Cl.
- *H01M 4/38* (2006.01)
- *H01M 10/0525* (2010.01)
- *H01M 4/04* (2006.01)
- *H01M 10/058* (2010.01)

(52) U.S. Cl.
CPC ..... *H01M 10/058* (2013.01); *H01M 10/0525* (2013.01); *H01M 2300/0068* (2013.01); *Y02T 10/7011* (2013.01)

(56) References Cited

U.S. PATENT DOCUMENTS

| | | | | |
|---|---|---|---|---|
| 2011/0183207 A1* | 7/2011 | Hirose | | H01M 4/134 429/218.1 |
| 2011/0192623 A1* | 8/2011 | Fujinaga | | H01M 4/134 173/217 |
| 2011/0300444 A1* | 12/2011 | Nakamura | | H01M 4/136 429/215 |
| 2012/0135285 A1* | 5/2012 | Iwama | | H01M 2/26 429/94 |
| 2012/0202117 A1* | 8/2012 | Hirose | | H01M 4/134 429/211 |
| 2013/0115510 A1* | 5/2013 | Tani | | H01M 4/0404 429/199 |
| 2014/0017564 A1* | 1/2014 | Suzuki | | C22F 1/08 429/211 |
| 2014/0159675 A1 | 6/2014 | Kodama | | |
| 2015/0207122 A1* | 7/2015 | Yoshitomi | | H01M 2/1653 429/145 |
| 2017/0141403 A1* | 5/2017 | Song | | H01M 4/131 |

FOREIGN PATENT DOCUMENTS

| | | |
|---|---|---|
| JP | 2012146512 A | 8/2012 |
| JP | 2012146553 A | 8/2012 |
| JP | 2013-201145 A | 10/2013 |
| JP | 2013-229315 A | 11/2013 |
| KR | 20140021072 A | 2/2014 |

* cited by examiner

SOLID LITHIUM SECONDARY BATTERY AND METHOD OF MANUFACTURING SAME

TECHNICAL FIELD

The present invention relates a solid lithium secondary battery in which occurrence of short-circuit is suppressed during charging.

BACKGROUND ART

Along with the rapid distribution of information-related equipment and communication equipment such as personal computers, video cameras, and mobile telephones in recent years, the development of batteries that are utilized as electric power sources thereof has been considered important. Furthermore, the development of high output power and high capacity batteries for electric vehicles or hybrid vehicles is in progress in the field of automobile industry and the like as well. Currently, among various batteries, lithium batteries are attracting attention because of its high energy densities.

In regard to the lithium batteries that are currently available in the market, since liquid electrolytes including flammable organic solvents are used, installation of safety devices that suppress temperature increase at the time of short circuits, and devices for preventing short circuits are needed. Meanwhile, since lithium batteries that have been produced into all solid state batteries by converting the liquid electrolyte to a solid electrolyte layer do not use flammable organic solvents in the batteries, it is contemplated that simplification of safety devices can be promoted, and the lithium batteries are excellent in view of the production cost and productivity.

Patent Literature 1 discloses a secondary battery in which a cathode and an anode are disposed through an electrolyte. The secondary battery is configured in a state in which an active material layer is not formed on an anode current collector during assembly, and an alkali metal and the like precipitate onto the anode current collector during charging. An object of this technology is to improve a battery capacity.

In addition, Patent Literature 2 discloses a method of manufacturing a lithium ion secondary battery. In the method, a concavo-convex shape is formed on surfaces of a cathode active material layer and an anode active material layer, respectively, a solid electrolyte layer is disposed between the cathode active material layer and the anode active material layer, and then a heating treatment is performed. In addition, as a pitch of the concavo-convex shape, a pitch of 20 nm to 1 μm is described. In this technology, the concavo-convex shape is formed, and thus a contact area between the solid electrolyte layer, the cathode active material layer, and the anode active material layer is increased.

In addition, Patent Literature 3 discloses a lithium ion secondary battery using a solid electrolyte layer in which concavity and convexity are formed on a surface thereof. In the lithium ion secondary battery, a cathode and/or an anode have a surface shape conforming to the concavity and convexity. In addition, as a shape of the concavity and convexity, a linear shape having a depth of approximately 180 μm is disclosed. In this technology, the concavo-convex shape is formed, and thus a contact area between the solid electrolyte layer and the electrodes is increased.

In addition, Patent Literature 4 discloses a lithium secondary battery which includes a cathode, an anode, and a nonaqueous electrolyte, and in which $R_z$ on a lithium metal precipitation surface of an anode current collector is 10 μm or less. Patent Literature 4 discloses a configuration in which $R_z$ is made to be small, and thus a current distribution on an anode current collector surface can be uniform, and generation of dendrite can be suppressed.

CITATION LIST

Patent Literature

Patent Literature 1: Japanese Patent Application Laid-Open No. 2011-159596
Patent Literature 2: Japanese Patent Application Laid-Open No. 2013-229315
Patent Literature 3: Japanese Patent Application Laid-Open No. 2013-201145
Patent Literature 4: Japanese Parent Application Laid-Open No. 2001-243957

SUMMARY OF INVENTION

Technical Problem

In a solid lithium secondary battery in which an anode active material layer is not provided at the time of assembly, and an Li metal is allowed to precipitate as an anode active material through the subsequent charging, there is a specific problem in that short-circuit due to dendrite tends to occur in comparison to a solid lithium secondary battery in which the anode active material layer is provided at the time of assembly. In a case where the charging is performed with respect to the solid lithium secondary battery in which the anode active material layer is provided at the time of assembly, Li penetrates into an anode active material (for example, carbon), and thus typically, Li precipitation does not immediately occur on the surface of the anode active material. In contrast, in a case where the anode active material layer is not provided at the time of assembly, the Li precipitation occurs on the surface of the anode current collector during charging, and thus short-circuit due to dendrite tends to occur.

In addition, in a solid lithium secondary battery including a solid electrolyte layer (pressed powder type solid electrolyte layer) that includes sulfide solid electrolyte particles, unlike a battery using a liquid electrolyte, in a case where surface roughness of the anode current collector is too small, there is a problem in that short-circuit due to dendrite tends to occur. In a case of using the liquid electrolyte, it is preferable that the surface of the anode current collector is relatively smooth in order for the liquid electrolyte to come into uniform contact with the surface of the anode current collector. However, in the case of using the pressed powder type solid electrolyte layer, solid electrolyte particles do not come into uniform contact with the surface of the anode current collector. Therefore, when the surface roughness of the anode current collector is too small, on the contrary, short-circuit due to dendrite tends to occur. This is a specific problem of the solid lithium secondary battery including the pressed powder type solid electrolyte layer. On the other hand, even in a case where the surface roughness of the anode current collector is too large, as described later, there is a problem in that short-circuit due to dendrite tends to occur.

The invention has been made in consideration of the above-described problem, and a main object thereof is to provide a solid lithium secondary battery in which occurrence of short-circuit is suppressed during charging.

Solution to Problem

To solve the above-described problem, according to an aspect of the invention, there is provided a solid lithium secondary battery, comprising an anode current collector, a solid electrolyte layer, a cathode active material layer, and a cathode current collector in this order, wherein the solid electrolyte layer is provided on a surface of the anode current collector, the solid electrolyte layer contains a sulfide solid electrolyte particle, a surface shape of the solid electrolyte layer, which faces the anode current collector, is formed in correspondence with a surface shape of the anode current collector, and 10-point average roughness ($R_z$) of the surface of the anode current collector on a solid electrolyte layer side, and 10-point average roughness ($R_z$) of a surface of the solid electrolyte layer on an anode current collector side are in a range of 1.8 μm to 2.5 μm, respectively.

According to this aspect, the surface shape of the solid electrolyte layer is formed in correspondence with the surface shape of the anode current collector, and the surface roughness of the anode current collector and the solid electrolyte layer is in a very limited range. Accordingly, it is possible to obtain a solid lithium secondary battery in which occurrence of short-circuit is suppressed during charging.

In addition, according to another aspect of the invention, there is provided a solid lithium secondary battery comprising an anode current collector, a solid electrolyte layer, a cathode active material layer, and a cathode current collector in this order, wherein an anode active material layer, which is a Li metal that precipitated, is provided on a surface of the anode current collector on a solid electrolyte layer side, the solid electrolyte layer contains a sulfide solid electrolyte particle, a surface shape of the solid electrolyte layer, which faces the anode current collector, is formed in correspondence with a surface shape of the anode current collector, and 10-point average roughness ($R_z$) of the surface of the anode current collector on a solid electrolyte layer side, and 10-point average roughness ($R_z$) of a surface of the solid electrolyte layer on an anode current collector side are in a range of 1.8 μm to 2.5 μm, respectively.

According to this aspect, the surface shape of the solid electrolyte layer is formed in correspondence with the surface shape of the anode current collector, and the surface roughness of the anode current collector and the solid electrolyte layer is in a very limited range. Accordingly, it is possible to obtain a solid lithium secondary battery in which occurrence of short-circuit is suppressed during charging.

In addition, according to still another aspect of the invention, there is provided a method of manufacturing a solid lithium secondary battery, the method comprising steps of: a preparation process of preparing a laminated body comprising an anode current collector, a solid electrolyte layer, a cathode active material layer, and a cathode current collector in this order; and a charging process of performing a charging treatment with respect to the laminated body, characterized in that in the preparation process, a pressurization treatment is performed in a state in which at least the anode current collector and a material for formation of the solid electrolyte layer are disposed so as to transfer a surface shape of the anode current collector to a surface of the solid electrolyte layer that faces the anode current collector, in the charging process, Li that is contained in the cathode active material layer is allowed to migrate toward an anode current collector side so as to form an anode active material layer, which is a Li metal that precipitated, on a surface of the anode current collector on a solid electrolyte layer side, the solid electrolyte layer contains a sulfide solid electrolyte particle, and 10-point average roughness ($R_z$) of the surface of the anode current collector on the solid electrolyte layer side, and 10-point average roughness ($R_z$) of the surface of the solid electrolyte layer on the anode current collector side are in a range of 1.8 μm to 2.5 μm, respectively.

According to this aspect, the surface shape of the anode current collector is transferred to the surface of the solid electrolyte layer, and the surface roughness of the anode current collector and the solid electrolyte layer is in very limited range. Accordingly, it is possible to obtain a solid lithium secondary battery in which occurrence of short-circuit is suppressed during charging.

Advantageous Effects of Invention

According to the solid lithium secondary battery of the invention, it is possible to obtain an effect of suppressing occurrence of short-circuit during charging.

DESCRIPTION OF EMBODIMENTS

Hereinafter, a solid lithium secondary battery of the invention, and a method of manufacturing the solid lithium secondary battery will be described in detail.

A. Solid Lithium Secondary Battery

First, the solid lithium secondary battery of the invention can be roughly classified into two embodiments. Hereinafter, description will be given of the solid lithium secondary battery of the invention in classification into a first embodiment and a second embodiment.

1. First Embodiment

Figure 1A:
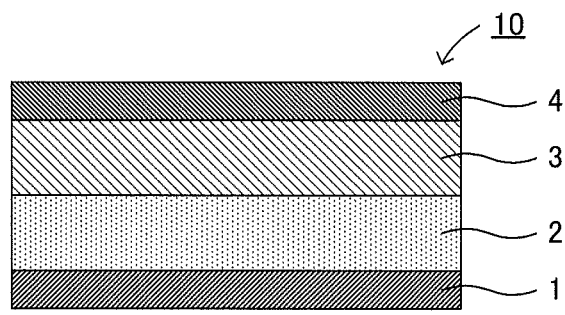
FIGS. 1A and 1B are schematic sectional views each illustrating an example of a solid lithium secondary battery of the invention.
Figure 1B:
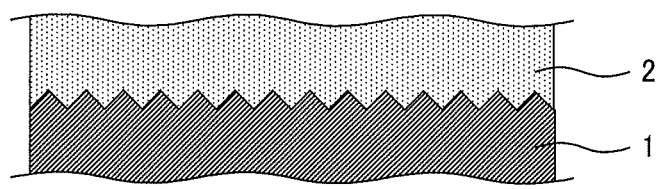

FIG. 1A is a schematic sectional view illustrating an example of a solid lithium secondary battery of a first embodiment, and FIG. 1B is a partially enlarged view of FIG. 1A.

As illustrated in FIG. 1A, a solid lithium secondary battery 10 of the first embodiment comprises an anode current collector 1, a solid electrolyte layer 2, a cathode active material layer 3, and a cathode current collector 4 in this order. The solid electrolyte layer 2 is disposed on a surface of the anode current collector 1, and both of these come into contact with each other. In addition, the solid electrolyte layer 2 contains sulfide solid electrolyte particles (not illustrated). In addition, as illustrated in FIG. 1B, a surface shape of the solid electrolyte layer 2, which faces the anode current collector 1, is formed in correspondence with a surface shape of the anode current collector 1. 10-point average roughness ($R_z$) of a surface of the anode current collector 1 on a solid electrolyte layer 2 side, and 10-point average roughness ($R_z$) of a surface of the solid electrolyte layer 2 on an anode current collector 1 side are in a specific range.

According to the first embodiment, the surface shape of the solid electrolyte layer is formed in correspondence with the surface shape of the anode current collector, and the surface roughness of the anode current collector and the solid electrolyte layer is in a very limited range. According to this, it is possible to obtain a solid lithium secondary battery in which occurrence of short-circuit is suppressed during charging.

The reason why the occurrence of short-circuit can be suppressed during charging is assumed as follows. First, in a case where the surface roughness of the anode current collector is too small (for example, in a Case of using an anode current collector of which surface is subjected to a mirror finish treatment), the sulfide solid electrolyte particles which are contained in the solid electrolyte layer are less likely to come into uniform contact with a surface of the anode current collector unlike a liquid electrolyte. Therefore, it is assumed that current concentration occurs only at a portion that comes into contact with the surface, and thus dendrite tends to be generated. Similarly, in a case where the surface roughness of the anode current collector is too small, slight peeling-off occurs between the anode current collector and the solid electrolyte layer due to a Li metal that precipitated to an interface between the anode current collector and the solid electrolyte layer. Accordingly, current concentration occurs to the Li metal that precipitated; and thus it is assumed that dendrite tends to be generated. On the other hand, in a case where the surface roughness of the anode current collector is too large (for example, in a case of using an anode current collector of which surface is subjected to a roughening treatment), a protruding portion of a surface is large, and thus current concentration occurs at the protruding portion, and thus it is assumed that dendrite tends to be generated.

In contrast, in the first embodiment, the surface roughness of the anode current collector and the solid electrolyte layer is in a very limited range, and thus it is possible to suppress occurrence of short-circuit during charging. Specifically, it is possible to bring the anode current collector and the solid electrolyte layer into more uniform contact with each other (it is possible to attain an improvement in a contact area) in comparison to a case where the surface roughness of the anode current collector is too small. In addition, it is possible to further attain an improvement in adhesiveness due to an anchor effect in comparison to a case where the surface roughness of the anode current collector is too small, and it is possible to suppress occurrence of slight peeling-off between the anode current collector and the solid electrolyte layer due to an Li metal that precipitated. On the other hand, it is possible to further suppress current concentration that is derived from the protruding portion in comparison to a case where the surface roughness of the anode current collector is too large. In this manner, in the first embodiment, it is possible to control the contact area, the adhesiveness, and the problem caused by protruding portion with balance, and it is possible to suppress occurrence of short-circuit during charging.

In addition, in the first embodiment, the surface shape of the solid electrolyte layer is formed in correspondence with the surface shape of the anode current collector. The sulfide solid electrolyte particles are considered as a soft material, and are used after plastic deformation. Accordingly, there is an advantage in that is possible to particularly attain an improvement in the contact area and the adhesiveness. In addition, when the surface shape of the solid electrolyte layer is formed in correspondence with the surface shape of the anode current collector, if the Li metal precipitates, it is possible to attain an improvement in the contact area and the adhesiveness on both surfaces (a surface on an anode current collector side, and a surface on a solid electrolyte layer side).

In addition, in the first embodiment, the surface roughness of the anode current collector is defined as 10-point average roughness ($R_z$). Examples of the surface roughness include arithmetic average roughness $R_a$, maximum height $R_y$, and 10-point average roughness $R_z$. $R_y$ represents one-site roughness, and roughness of the other sites is not clear, and thus it is considered that $R_y$ is not suitable for evaluation of a current collector to which the Li metal precipitates. $R_a$ represents roughness in the entirety, and in case of uniform roughness, it is considered that $R_a$ is suitable for evaluation of the current collector to which the Li metal precipitates. On the other hand, in the case of uneven roughness, for example, even when only one large-roughness site is present, if roughness of the other sites is small, $R_a$ decreases. Therefore, as is the case with $R_y$, it is considered that $R_a$ is not suitable for evaluation of the current collector to which Li metal precipitates. $R_z$ is calculated from not only one site similarly to $R_y$, but also 5 points at a convex portion and 5 points at a concave portion. Accordingly, $R_z$ becomes an average concavo-convex index, and is suitable for evaluation of the current collector to which the Li metal precipitates.

In addition, in the solid lithium secondary battery of the first embodiment, the anode active material (Li metal) is not provided at a stage before charging (at the time of battery assembly), and the anode active material (Li metal) is allowed to precipitate and to be self-formed by using Li that is contained in the cathode active material layer during charging. According to this, the first embodiment is more advantageous in comparison to a case where the anode active material layer is provided in advance when considering a volume and weight, and thus it is possible to attain a high energy density of a battery. In addition, it is possible to reduce an amount of Li metal that is used for the battery as much as possible, and thus a reaction derived from the Li metal becomes relatively less.

Hereinafter, description will be given of the solid lithium secondary battery of the first embodiment for each configuration.

(1) Anode Current Collector

In the first embodiment, the anode current collector is disposed to come into contact with the solid electrolyte layer. In addition, the 10-point average roughness ($R_z$) of a surface of the anode current collector on a solid electrolyte layer side is typically 1.8 μm or greater, and is preferably 1.9 μm or greater. On the other hand, $R_z$ is typically 2.5 μm or less. It is preferable that $R_z$ is 2.4 km or less, and more preferably 2.3 km or less. Incidentally, a value of $R_z$ can be obtained through measurement based on JIS B0601. In addition, with regard to the 10-point average roughness ($R_z$) of a surface of the anode current collector on the solid electrolyte layer side, it is preferable that coulombic efficiency is in a range of 80% or greater in charging and discharging measurement by using a predetermined current density.

It is preferable that a material of the anode current collector is a material that does not form an alloy with Li, and examples thereof include SUS, copper, nickel, and carbon. Examples of a type of the anode current collector include a thin shape and a sheet shape. A shape of the anode current collector in a plan view is not particularly limited, and examples thereof include a circular shape, an elliptical shape, a rectangular shape, and an arbitrary polygonal shape. In addition, the thickness of the anode current collector is different depending on the shape. For example, the thickness is in a range of 1 μm to 50 μm, and is preferably in a range of 5 μm to 20 μm.

(2) Solid Electrolyte Layer

In the first embodiment, the solid electrolyte layer contains sulfide solid electrolyte particles. The sulfide solid electrolyte particles are pressurized (compressed) to obtain the solid electrolyte layer. In addition, in the first embodiment, the surface shape of the solid electrolyte layer, which faces the anode current collector, is formed in correspondence with the surface shape of the anode current collector. Specifically, plastic deformation of the sulfide solid electrolyte particles occurs through the following pressurization treatment, and the surface shape of the solid electrolyte layer is formed to follow the surface shape of the anode current collector. As a result, the 10-point average roughness ($R_z$) of the surface of the solid electrolyte layer on the anode current collector side becomes substantially the same as the surface roughness of the anode current collector. The 10-point average roughness ($R_z$) of the surface of the solid electrolyte layer on the anode current collector side is typically 1.8 μm or greater, and is preferably 1.9 μm or greater. On the other hand, $R_z$ is typically 2.5 μm or less. It is preferable that $R_z$ is 2.4 μm or less, and more preferably 2.3 μm or less. Incidentally, it is possible to confirm whether or not the surface shape of the solid electrolyte layer corresponds to the surface shape of the anode current collector by observing an interface, for example, with a scanning electron microscope.

Examples of the sulfide solid electrolyte particles include $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (in which, "m" and "n" represent a positive number, and Z represents any one of Ge, Zn, and Ga), $Li_2S$—$GeS_2$, $Li_2S$—$SiS_2$—$Li_3PO_4$, $Li_2S$—$SiS_2$—$Li_xMO_y$ (in which, "x" and "y" represent a positive number, and M represents any one of P, Si, Ge, B, Al, Ga, and In), and $Li_{10}GeP_2S_{12}$. The sulfide solid electrolyte particles may be amorphous, crystalline, or glass ceramics. In addition, it is preferable that the sulfide solid electrolyte particles do not contain a metal element such as Ge and Si so as to use the Li metal as the anode active material. The reason for the preference is that reduction resistance is improved.

It is preferable that the sulfide solid electrolyte particles include an ion conductor including a Li element, a P element, and an S element. The ion conductor is typically configured in an anion structure including a Li cation, P, and S. Among these, it is preferable that the ion conductor contains a $PS_4^{3-}$ structure as a main body (50% by mole or greater) of the anion structure. Here, it is preferable that a ratio of the $PS_4^{3-}$ structure is 60% by mole or greater based on the entirety of the anion structure of the ion conductor, more preferably 70% by mole or greater, still more preferably 80% by mole or greater, and still more preferably 90% by mole or greater. Incidentally, the ratio of the $PS_4^{3-}$ structure may be determined by Raman spectroscopy, NMR, XPS, and the like.

In addition, the sulfide solid electrolyte particles include the ion conductor as a main body. It is preferable that the ratio of the ion conductor in the sulfide solid electrolyte particles is 65% by mole or greater, more preferably 70% by mole or greater, and still more preferably 75% by mole or greater. In addition, the sulfide solid electrolyte particles may be constituted by only the ion conductor, and may contain other components. Examples of the other components include LiI.

For example, a ratio of LiI is 5% by mole or greater. It is preferable that the ratio is 10% by mole or greater, and more preferably 20% by mole or greater. On the other hand, for example, the ratio of LiI is 35% by mole or less. It is preferable that the ratio is 30% by mole or less. Particularly, it is preferable that the sulfide solid electrolyte particles have a composition of $xLiI\cdot(100-x)(yLi_2S\cdot(1-y)P_2S_5)$ ($20 \leq x \leq 30$, $0.7 \leq y \leq 0.8$). Incidentally, it is preferable that "y" is 0.72 or greater, and more preferably 0.74 or greater. In addition, it is preferable that "y" is 0.78 or less, and more preferably 0.76 or less.

In addition, it is preferable that the sulfide solid electrolyte particles substantially do not contain $Li_2S$. The reason for the preference is that it is possible to reduce the amount of hydrogen sulfide that is generated. $Li_2S$ reacts with water to generate hydrogen sulfide. For example, when the ratio of $Li_2S$ included in a raw material composition is large, $Li_2S$ tends to remain. A composition which "$Li_2S$ is substantially not contained" can be confirmed with X-ray diffraction. Specifically, in the case of not having peaks (2θ=27.0°, 31.2°, 44.8°, 53.1°) of $Li_2S$, it is possible to determine that $Li_2S$ is substantially not contained.

In addition, it is preferable that the sulfide solid electrolyte particles substantially do not contain cross-linking sulfur. The reason for the preference is that it is possible to reduce an amount of hydrogen sulfide that is generated. The "cross-linking sulfur" represents cross-linking sulfur in a compound obtained through reaction between $Li_2S$ and a sulfide of P. Examples thereof include cross-linking sulfur having a $S_3P$—S—$PS_3$ structure obtained through reaction between $Li_2S$ and $P_2S_5$. The cross-linking sulfur is likely to react with water, and the hydrogen sulfide tends to occur. In addition, a composition which "substantially does not contain cross-linking sulfur" can be confirmed through measurement of Raman spectral spectrum. For example, a peak of the $S_3P$—S—$PS_3$ structure is typically shown at 402 cm$^{-1}$. Accordingly, it is preferable that this peak is not detected. In addition, a peak of the $PS_4^{3-}$ structure is typically shown at 417 cm$^{-1}$. It is preferable that the intensity $I_{402}$ at 402 cm$^{-1}$ is smaller than the intensity $I_{417}$ at 417 cm$^{-1}$. More specifically, it is preferable that the intensity $I_{402}$ is, for example, 70% or less of the intensity $I_{417}$, more preferably 50% or less, and still more preferably 35% or less.

In addition, the sulfide solid electrolyte particles may be a substance (sulfide glass) that is obtained by subjecting a raw material composition containing $Li_2S$, a sulfide of P (phosphorus), and LiI to an amorphization step, or a substance (glass ceramics) by subjecting the raw material composition to a crystallization step. It is preferable that Li$_2$S has less impurity. The reason for the preference is that it is possible to suppress a side reaction. On the other hand, examples of the sulfide of P (phosphorus) include P$_2$S$_3$ and P$_2$S$_5$. Incidentally, an elementary substance of P and an elementary substance S may be used instead of the sulfide of P (phosphorous). In addition, examples of an amorphization method include a mechanical milling method and a melting and quenching method. Examples of the mechanical milling include a ball mill, a vibration mill, a turbo mill, mechanofusion, and a disc mill. In addition, the mechanical milling can be performed in a dry type or a wet type, but the latter is preferable. The reason for the preference is that it is possible to obtain sulfide solid electrolyte particles with high uniformity. Examples of methods of crystallization include a method of heating at the crystallization temperature or higher.

In a case where the raw material composition contains Li$_2$S and P$_2$S$_5$, a ratio of stoichiometrically obtaining an ortho composition is Li$_2$S:P$_2$S$_5$=75:25 based on mole. Here, typically, the "ortho" represents a composition, in which a hydration degree is the highest, among oxo-acids obtained by hydrating the same oxide. Among sulfides, a crystal composition in which Li$_2$S is added to the most extent is referred to as the ortho composition. For example, in a Li$_2$S—P$_2$S$_5$ system, Li$_3$PS$_4$ corresponds to the ortho composition. In a case where the raw material composition contains Li$_2$S and P$_2$S$_5$, it is preferable that a ratio of Li$_2$S to the sum of the Li$_2$S and P$_2$S$_5$ is in a range of 70% by mole to 80% by mole, more preferably 72% by mole to 78% by mole, and still more preferably 74% by mole to 76% by mole.

For example, an average particle size ($D_{50}$) of the sulfide solid electrolyte particles is 0.01 μm or greater, and is preferably 0.1 μm or greater. On the other hand, for example, the average particle size ($D_{50}$) of the sulfide solid electrolyte particles is 50 μm or less, and is preferably 30 μm or less. In addition, it is preferable that the sulfide solid electrolyte particles have high Li ion conductivity. For example, it is preferable that the Li ion conductivity at room temperature (25°) is $1 \times 10^{-4}$ S/cm or greater, and more preferably $1 \times 10^{-3}$ S/cm or greater.

The solid electrolyte layer may be constituted by only the sulfide solid electrolyte particles, or may contain other components. Examples of the other components include the following binding material. For example, a ratio of the sulfide solid electrolyte particles which are contained in the solid electrolyte layer is 50% by volume or greater. It is preferable that the ratio is 60% by volume or greater, more preferably 70% by volume or greater, still more preferably 80% by volume or greater, and still more preferably 90% by volume or greater.

For example, the thickness of the solid electrolyte layer is 1000 μm or less. It is preferable that the thickness is 500 μm or less, and more preferably, 300 μm or less. On the other hand, for example, the thickness of the solid electrolyte layer is 1 μm or greater, and is preferably 10 μm or greater. Incidentally, the thickness of the solid electrolyte layer represents an average thickness of the solid electrolyte layer.

For example, an average pore radius of the solid electrolyte layer which is obtained by a mercury intrusion method is 0.0057 μm or less. It is preferable that the average pore radius is 0.0054 μm or less, and more preferably 0.0051 μm or less. The average pore radius of the solid electrolyte layer is obtained by the mercury intrusion method.

For example, a filling ratio of the solid electrolyte layer is 89% or greater. It is preferable that the filling ratio is 90% or greater, more preferably 92% or greater, and still more preferably 94% or greater. It is possible to calculate the filling ratio of the solid electrolyte layer through comparison between a true density obtained by the Archimedes method, and an apparent density calculated from the thickness and weight of a pellet.

(3) Cathode Active Material Layer

The cathode active material layer is a layer that contains at least a cathode active material, and the cathode active material layer may contain at least one of a solid electrolyte material, a conductive material, and a binding material as necessary. Typically, the cathode active material contains Li. Examples of the cathode active material include an oxide active material, and specific examples thereof include a rock salt halite bedded type active material such as LiCoO$_2$, LiMnO$_2$, LiNiO$_2$, LiVO$_2$, and LiNi$_{1/3}$Co$_{1/3}$Mn$_{1/3}$O$_2$, a spinel type active material such as LiMn$_2$O$_4$ and Li(Ni$_{0.5}$Mn$_{1.5}$)O$_4$, an olivine type active material such as LiFePO$_4$, LiMnPO$_4$, LiNiPO$_4$, and LiCuPO$_4$. In addition, a Si-containing oxide such as Li$_2$FeSiO$_4$ and Li$_2$MnSiO$_4$ may be used as the cathode active material. For example, it is preferable that the average particle size ($D_{50}$) of the cathode active material is in a range of 1 μm to 50 μm, more preferably 1 μm to 20 μm, and still more preferably 1 μm to 10 μm.

In addition, the surface of the cathode active material may be coated with a coating layer. The reason for this configuration is that it is possible to suppress reaction between the cathode active material and the solid electrolyte material. Examples of a material of the coating layer include a Li ion conductive oxide such as LiNbO$_3$, Li$_3$PO$_4$, and LiPON. For example, it is preferable that the average thickness of the coating layer is in a range of 1 nm to 20 nm, and more preferably 1 nm to 10 nm.

The cathode active material layer may further contain a solid electrolyte material. The kind of the solid electrolyte material is not particularly limited, and examples thereof include a sulfide solid electrolyte material. As the sulfide solid electrolyte material, the same material as the above-described sulfide solid electrolyte particles may be used.

The cathode active material layer may further contain a conductive material. It is possible to improve conductivity of the cathode active material layer through addition of the conductive material. Examples of the conductive material include acetylene black, Ketjen black, and carbon fiber. In addition, the cathode active material layer may further contain a binding material. Examples of the kind of the binding material include a fluorine-containing binding material such as polyvinylidene fluoride (PVDF). In addition, it is preferable that the thickness of the cathode active material layer is, for example, in a range of 0.1 μm to 1000 μm.

(4) Other Configurations

Typically, the solid lithium secondary battery comprises a cathode current collector that performs current collection of the cathode active material layer. Examples of a material of the cathode current collector include SUS, aluminum, nickel, iron, titanium, and carbon. It is preferable to appropriately select the thickness, the shape, and the like of the cathode current collector in accordance with factors such as usage of a battery. In addition, as a battery case, a battery case of a typical battery may be used. Examples of the battery case include a SUS battery case. The battery case may also have a function of at least one of the anode current collector and the cathode current collector.

(5) Solid Lithium Secondary Battery

The solid lithium secondary battery of the first embodiment is not particularly limited as long as the solid lithium secondary battery comprises the solid electrolyte layer, the anode current collector, the cathode active material layer, and the cathode current collector. In addition, the solid lithium secondary battery of the first embodiment is in a state before being charged or a state of being completely discharged.

The solid lithium secondary battery of the first embodiment may comprise a charging control unit that controls a current density during charging. The current density during charging is not particularly limited as long as short-circuit does not occur at the current density. For example, the current density is 0.026 mA/cm$^2$ or greater. It is preferable that the current density is 0.26 mA/cm$^2$ or greater, more preferably 1.3 mA/cm$^2$ or greater, and still more preferably 2.6 mA/cm$^2$ or greater. On the other hand, for example, the current density during charging is 52 mA/cm$^2$ or less. It is preferable that the current density during charging is 10.4 mA/cm$^2$ or less, and more preferably 5.2 mA/cm$^2$ or less.

A restriction pressure in a thickness direction may be applied to the solid lithium secondary battery of the first embodiment by a restriction member. The kind of the restriction member is not particularly limited, and a typical restriction member may be used. The restriction pressure (surface pressure) is not particularly limited, and is, for example, 0.1 MPa or higher. It is preferable that restriction pressure is 1 MPa or higher. When raising the restriction pressure, there is an advantage in that it is easy to maintain contact between particles such as contact between active material particles and electrolyte particles. On the other hand, for example, the restriction pressure (surface pressure) is 100 MPa or lower, and is preferably 50 MPa or lower. The reason for the preference is as follows. When the restriction pressure is too high, the restriction member is demanded to have high rigidity, and thus the size of the restriction member may increase.

Usage of the solid lithium secondary battery is not particularly limited, and the solid lithium secondary battery is useful, for example, as an in-vehicle battery. Examples of the shape of the solid lithium secondary battery include a coin type, a laminate type, a cylinder type, and a square type.

2. Second Embodiment

Figure 2A:
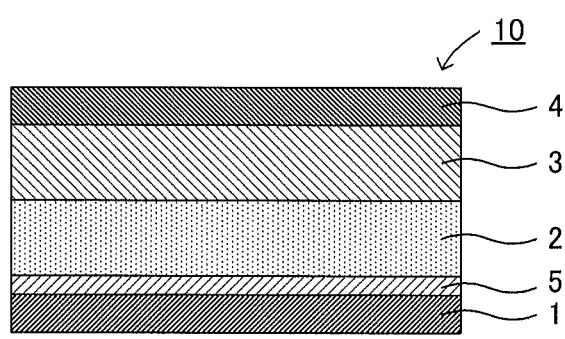
FIGS. 2A and 2B are schematic sectional views each illustrating another example of the solid lithium secondary battery of the invention.
Figure 2B:
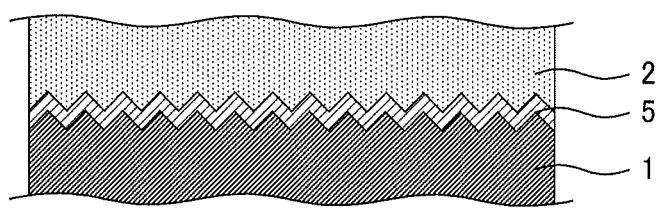

FIG. 2A is a schematic sectional view illustrating an example of a solid lithium secondary battery of a second embodiment, and FIG. 2B is a partially enlarged view of FIG. 2A. As illustrated in FIGS. 2A and 2B, a solid lithium secondary battery 10 of the second embodiment comprises an anode current collector 1, a solid electrolyte layer 2, a cathode active material layer 3, and a cathode current collector 4 in this order. In addition, the solid lithium secondary battery 10 comprises an anode active material layer 5 that is a Li metal precipitated onto a solid electrolyte layer 2 side of the anode current collector 1. The Li metal is a soft metal, and thus it is assumed that the Li metal has no effect on the surface roughness of the solid electrolyte layer 2, and precipitates to an interface (a minute void that exists in the solid electrolyte layer 2) between the anode current collector 1 and the solid electrolyte layer 2. Incidentally, the other characteristics are the same as those in the above-described first embodiment.

Here, precipitation of the Li metal to the surface of the anode current collector can be confirmed through observation of the interface between the anode current collector 1 and the solid electrolyte layer 2. For example, a field emission scanning electron microscope (FE-SEM) may be used for observation of the interface. For example, in a case where the Li metal is disposed in advance during deposition, the Li metal uniformly exists in a dense state. In addition, for example, in a case where Li metal foil is disposed in advance, when an appropriate compression pressure is applied, the Li metal uniformly exists in a dense state. On the other hand, in a case where the Li metal is allowed to precipitate, the Li metal exists to relatively conform to an electrolyte in a slightly loosened state. In addition, a surface of the Li metal that precipitated may have a fibrous shape (having a diameter of approximately 100 nm).

According to the second embodiment, the surface shape of the solid electrolyte layer is formed in correspondence with the surface shape of the anode current collector, and the surface roughness of the anode current collector and the solid electrolyte layer is in a very limited range. Accordingly, it is possible to obtain a solid lithium secondary battery in which occurrence of short-circuit is suppressed during charging.

The thickness of the Li metal that precipitates to the surface of the anode current collector also varies in accordance with a state of charge. For example, the maximum thickness of the Li metal is 50 μm or less. It is preferable that the maximum thickness is 30 μm or less, and more preferably 20 μm or less. Incidentally, the maximum thickness of the Li metal can be calculated as an average thickness in a state in which charging has proceeded to the most extent.

In addition, in the second embodiment, the Li metal that precipitates during charging is referred to as an anode active material. Accordingly, the amount of Li in the entirety of the battery is typically equal to the amount of Li in the cathode active material layer and the solid electrolyte layer. In addition, in a case where a electrochemical redox decomposition reaction and the like do not occur in the solid electrolyte layer, the amount of Li in the solid electrolyte layer is constant, and thus an amount of Li that is reduced from the cathode active material layer during charging and an amount of Li that precipitates onto the anode current collector during charging are equal to each other. In addition, in a state in which charging has proceeded completely, the cathode active material may not contain Li.

The other configurations in the second embodiment are the same as those described in the first embodiment, and thus description thereof will not be repeated. In addition, the solid lithium secondary battery of the second embodiment corresponds to a state in which charging is performed with respect to the solid lithium secondary battery of the first embodiment.

B. Method of Manufacturing Solid Lithium Secondary Battery

Figure 3A:
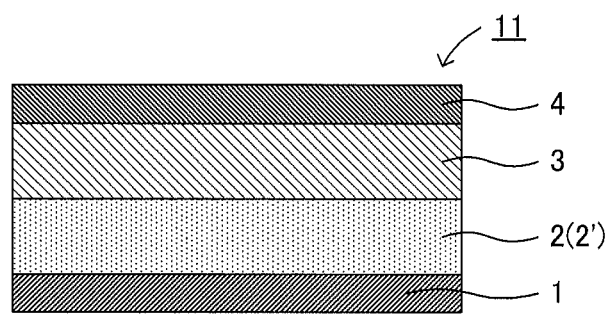
FIGS. 3A to 3C are schematic sectional views each illustrating an example of a method of manufacturing the solid lithium secondary battery of the invention.
Figure 3B:
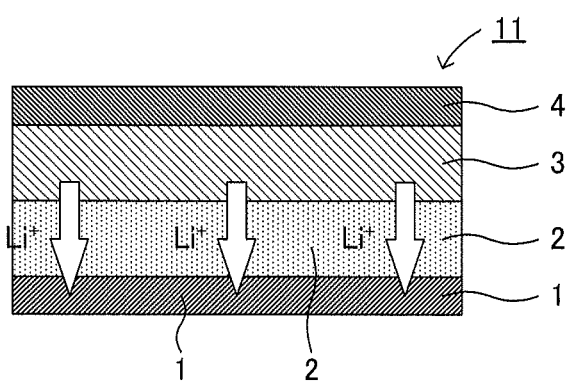
Figure 3C:
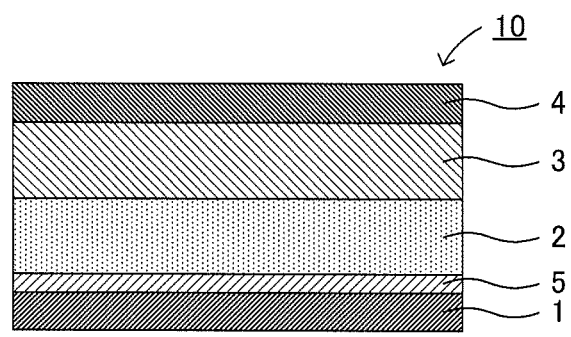
Figure 4:
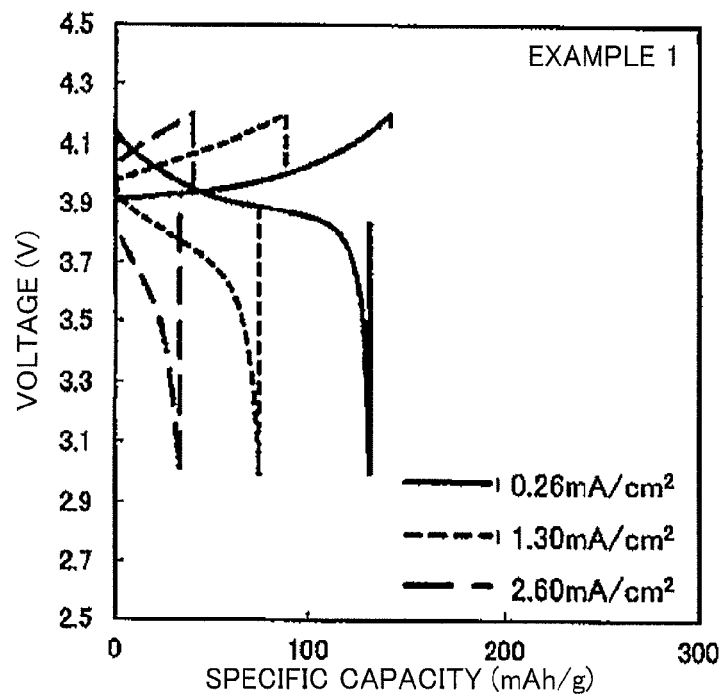
FIG. 4 illustrates a result obtained through charging and discharging measurement with respect to an evaluation battery that is obtained in Example 1.
Figure 5:
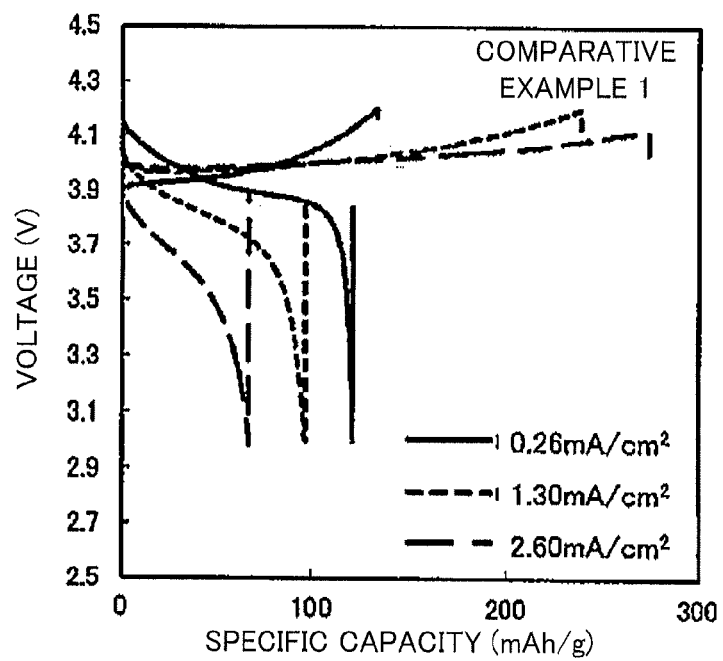
FIG. 5 illustrates a result obtained through charging and discharging measurement with respect to an evaluation battery that is obtained in Comparative Example 1.
Figure 6:
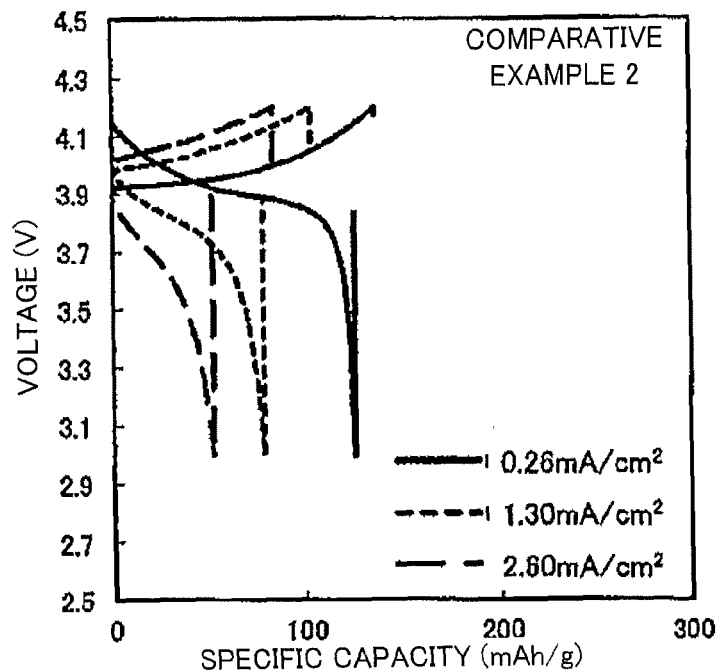
FIG. 6 illustrates a result obtained through charging and discharging measurement with respect to an evaluation battery that is obtained in Comparative Example 2.
Figure 7:
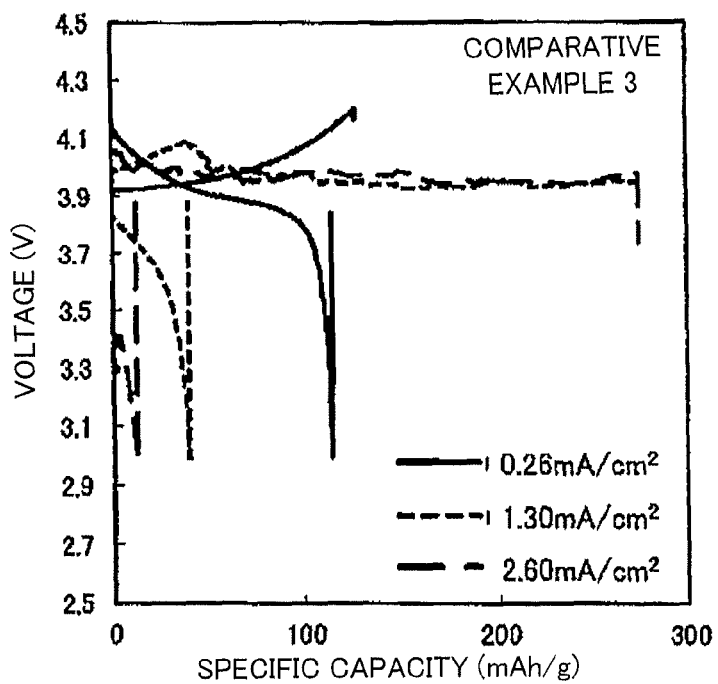
FIG. 7 illustrates a result obtained through charging and discharging measurement with respect to an evaluation battery that is obtained in Comparative Example 3.

FIGS. 3A to 3C are schematic sectional views each illustrating an example of the method of manufacturing the solid lithium secondary battery of the invention. First, a laminated body 11, which is provided with the anode current collector 1, the solid electrolyte layer 2, the cathode active material layer 3, and the cathode current collector 4 in this order, is prepared (FIG. 3A). Typically, the solid electrolyte layer 2 is disposed on a surface of the anode current collector 1, and both of these come into contact with each other. In addition, when manufacturing the laminated body 11, in a state in which at least the anode current collector 1 and a material 2' for formation of the solid electrolyte layer are disposed, a pressurization treatment is performed so as to transfer a surface shape of the anode current collector 1 to a surface of the solid electrolyte layer 2 that faces the anode current collector 1. Next, a charging treatment is performed with respect to the laminated body 11 so as to move Li contained in the cathode active material layer 3 toward the anode current collector 1 side (FIG. 3B). According to this, the Li metal (anode active material layer 5) precipitates to the surface of the anode current collector 1 (FIG. 3C). Incidentally, the other characteristics are the same as those described in the "A. Solid Lithium Secondary Battery".

According to the invention, the surface shape of the anode current collector is transferred to the surface of the solid electrolyte layer, and the surface roughness of the anode current collector and the solid electrolyte layer is in very limited range. Accordingly, it is possible to obtain a solid lithium secondary battery in which occurrence of short-circuit is suppressed during charging.

Hereinafter, description will be given of the method of manufacturing the solid lithium secondary battery of the invention for each process.

1. Preparation Process

The preparation process in the invention is a process of preparing a laminated body comprising the anode current collector, the solid electrolyte layer, the cathode active material layer, and the cathode current collector in this order.

Members which constitute the laminated body are the same as those described in "A. Solid Lithium Secondary Battery", and thus description thereof will not be repeated. In addition, the method of manufacturing the laminated body is not particularly limited as long as the method includes a process of performing a pressurization treatment in a state in which at least the anode current collector and the material for formation of the solid electrolyte layer are disposed. According to the pressurization treatment, the surface shape of the anode current collector is transferred to the surface of the solid electrolyte layer that faces the anode current collector. Specifically, according to the pressurization treatment, plastic deformation occurs in the sulfide solid electrolyte particles, and thus the surface shape of the solid electrolyte layer is formed to conform to the surface shape of the anode current collector.

A method of the pressurization treatment method is not particularly limited, and pressurization may be performed in a state in which a powdered material for formation of the solid electrolyte layer is disposed on the anode current collector. In addition, the pressurization may be performed in a state in which a layered material for formation of the solid electrolyte layer (for example, a temporarily molded solid electrolyte layer, or a solid electrolyte layer obtained by applying slurry and by drying the slurry) is disposed on the anode current collector. Incidentally, the material for formation of the solid electrolyte layer is a material for formation of the solid electrolyte layer. As described above, the material for formation of the solid electrolyte layer may contain only the sulfide solid electrolyte particles, or may further contain the binding material and the like as described above. In addition, it is preferable to use a molding jig (for example, a mold) during the pressurization treatment. That is, it is preferable that the anode current collector, and the material for formation of the solid electrolyte layer are disposed inside the molding jig, and the pressurization treatment is performed by using a pressurization jig. The molding jig may have a hollow shape, or may have a concave portion. In addition, the molding jig may be used as the battery case.

For example, the maximum pressure that is applied to the solid electrolyte layer is 550 MPa or higher. It is preferable that the maximum pressure is 600 MPa or higher, more preferably 650 MPa or higher, still more preferably 700 MPa or higher, and still more preferably 750 MPa or higher. On the other hand, for example, the maximum pressure that is applied to the solid electrolyte layer is 1000 MPa or lower, and is preferably 800 MPa or lower. When the pressure that is applied to the solid electrolyte layer is too high, an increase in size of the jig, or a problem such as a decrease in battery performance due to occurrence of cracking in the solid electrolyte particles may occur. Incidentally, "the maximum pressure that is applied to the solid electrolyte layer" represents the highest pressure among not only a pressure that is applied during a process of manufacturing the laminated body, but also pressures which are applied to the solid electrolyte layer during the following processes and the like. In addition, a pressurization method in the invention is not particularly limited, and examples thereof include a flat plate press, and a roll press.

As a method of manufacturing the laminated body, an arbitrary method can be employed. For example, a pressurization treatment may be performed to form only the anode current collector and the solid electrolyte layer, or the pressurization treatment may be performed in combination with pressurization of parts or the entirety of other members. In addition, the pressurization treatment during manufacturing of the laminated body may be performed once or plural times.

2. Charging Process

A charging process in the invention is a process of performing a charging treatment with respect to the laminated body.

A current density during charging is not particularly limited as long as short-circuit does not occur at the current density. For example, the current density is 0.026 mA/cm$^2$ or greater. It is preferable that the current density is 0.26 mA/cm$^2$ or greater, more preferably 1.3 mA/cm$^2$ or greater, and still more preferably 2.6 mA/cm$^2$ or greater. On the other hand, for example, the current density during charging is 52 mA/cm$^2$ or less. It is preferable that the current density is 10.4 mA/cm$^2$ or less, and more preferably 5.2 mA/cm$^2$ or less.

In the invention, the restriction pressure (surface pressure) may be or may not be applied to the laminated body during charging. For example, the restriction pressure (surface pressure) is 0.1 MPa or higher, and is preferably 1 MPa or higher. When raising the restriction pressure, there is an advantage in that it is easy to maintain contact between particles such as contact between active material particles and electrolyte particles. On the other hand, for example, the restriction pressure (surface pressure) is 100 MPa or lower, and is preferably 50 MPa or lower. The reason for the preference is as follows. When the restriction pressure is too high, the restriction member is demanded to have high rigidity, and thus the size of the restriction member may increase.

3. Solid Lithium Secondary Battery

The solid lithium secondary battery that is obtained by the invention is the same as that is described in "the second embodiment in A. Solid Lithium Secondary Battery", and thus description thereof will not be repeated.

Incidentally, the present invention is not intended to be limited to the embodiment described above. The embodiment described above is given only for illustrative purposes, and any embodiment having substantially the same configuration as the technical idea described in the claims of the present invention and provides similar operating effects, is construed to be included in the technical scope of the present invention.

EXAMPLES

Hereinafter, the present invention will be described more specifically by way of Examples.

Example 1

(Preparation of Sulfide Solid Electrolyte Particles)

As starting raw materials, lithium sulfide ($Li_2S$ with purity of 99.9%, manufactured by Nippon Chemical Industrial Co., LTD.), diphosphorus pentasulfide ($P_2S_5$ with purity of 99%, manufactured by Sigma-Aldrich Co. LLC.), and lithium iodide (LiI with purity of 99.9%, manufactured by Sigma-Aldrich Co. LLC.) were used. Next, $Li_2S$, $P_2S_5$, and LiI were mixed in a glove box set to an Ar atmosphere (dew point: −70° C.) in a composition ratio of $20LiI \cdot 80(0.75Li_2S \cdot 0.25P_2S_5)$. Put into a container of a planetary ball mill (45 cc, formed from $ZrO_2$) was 2 g of the resultant mixture, dehydrated heptane (amount of moisture is 30 ppm or less, 4 g) was put into the container, $ZrO_2$ balls ($\varphi$=5 mm, 53 g) were put into the container, and then the container was completely closed (Ar atmosphere). The container was mounted on a planetary ball milling machine (P7™ manufactured by Fritsch Japan Co., Ltd., and mechanical milling (treatment for one hour, and stoppage for 15 minutes) was performed 40 times at the table rotation number of 500 rpm. Next, drying was performed under conditions at 100° C. for one hour so as to remove the heptane. According to this, sulfide glass was obtained. Subsequently, the sulfide glass that was obtained was subjected to a heat treatment under conditions in an Ar atmosphere at 180° C. for three hours to crystallize the sulfide glass, thereby obtaining glass ceramics (sulfide solid electrolyte particles).

(Preparation of Cathode Mix)

As the cathode active material, $LiCoO_2$ (product name: CellSeed, average particle size $D_{50}$: 10 µm, manufactured by Nippon Chemical Industrial Co., LTD.) was prepared. A coating layer (average thickness: 10 nm) formed from $LiNbO_3$ was formed on a surface of the cathode active material by using a rolling and flowing coating apparatus (MP01™, manufactured by powrex corp.)

The cathode active material that was obtained ($LiCoO_2$ coated with $LiNbO_3$), and the sulfide solid electrolyte particles ($20LiD80(0.75Li_2S \cdot 0.25P_2S_5)$, glass ceramics, average particle size $D_{50}$=0.8 µm) were mixed with each other in a mass ratio of cathode active material:sulfide solid electrolyte particles=93:7. Incidentally, the average particle size of the sulfide solid electrolyte particles was adjusted through pulverization with a ball mill. Next, as a dispersion medium, dehydrated heptane was added to the resultant mixture, and mixing was performed with an ultrasonic homogenizer. Then, drying was performed at 100° C. for one hour, thereby obtaining a cathode mix.

(Preparation of Evaluation Battery)

Put into a cylinder manufactured by Macol was 100 mg of sulfide solid electrolyte particles ($20LiI \cdot 80(0.75Li_2S \cdot 0.25P_2S_5)$ glass ceramics, average particle size $D_{50}$=0.8 µm) and pressed therein at 98 MPa, thereby temporarily molding the solid electrolyte layer. Next, 20.4 mg of the cathode mix was provided on one surface of the solid electrolyte layer, and an anode current collector (copper foil, thickness: 18 µm, product name: F2-WS manufactured by FURUKAWA ELECTRIC CO., LTD.) having $R_z$ of 2.1 µm was disposed on the other surface of the solid electrolyte layer, and pressing was performed at 784 MPa. According to this, a battery pellet was obtained. The thickness of the solid electrolyte layer was 484 µm. Next, an SUS piston was disposed on both surfaces of the battery pellet that was obtained, and these was fastened with three bolts, thereby obtaining an evaluation battery (torque=2 Nm, surface pressure=15 MPa). Then, the evaluation battery was put into a glass container (Ar atmosphere) and the glass container was hermetically closed. Incidentally, any of the processes of using the sulfide solid electrolyte particles was performed in a glove box set to a dried Ar atmosphere.

Comparative Example 1

An evaluation battery was obtained in the same manner as in Example 1 except that a SUS piston of which surface was subjected to a mirror finish treatment was used as the anode current collector.

Comparative Example 2

An evaluation battery was obtained in the same manner as in Example 1 except that an anode current collector (copper foil, thickness: 18 µm, product name: FV-WS manufactured by FURUKAWA ELECTRIC CO., LTD.) having $R_z$ of 1.5 µm was used as the anode current collector.

Comparative Example 3

An evaluation battery was obtained in the same manner as in Example 1 except that an anode current collector (copper foil, thickness: 18 µm, product name: GTS-WS manufactured by FURUKAWA ELECTRIC CO., LTD.) having $R_z$ of 8 µm was used as the anode current collector.

[Evaluation]

(Charging and Discharging Measurement)

Charging and discharging measurement was performed by using the evaluation batteries which were obtained in Example 1, and Comparative Examples 1 to 3. Measurement conditions were as follows. A temperature was set to 25° C., a potential range was set to 3.0 V to 4.2 V, a current density was set to 0.26 $mA/cm^2$, 1.3 $mA/cm^2$ or 2.6 $mA/cm^2$, and a charging and discharging type was set to CC charging and discharging. In a case where internal short-circuit occurs, charging is not completed. Accordingly, in this case, charging was completed after passage of 20 hours, and then discharging was performed. Incidentally, determination of whether or not the internal short-circuit occurred was made based on whether or not rapid voltage drop occurred during charging.

The results are illustrated in FIGS. 4 to 7. As illustrated in FIGS. 4 to 7, in Comparative Examples 1 and 3, when charging was performed at a current density of 1.3 $mA/cm^2$ or greater, the rapid voltage drop was confirmed during charging. This is assumed to be because the internal short-circuit occurred, and thus voltage rising through charging was not performed in a normal manner. In contrast, in Example 1 and Comparative Example 2, the rapid voltage drop was not confirmed during charging, and apparent internal short-circuit was not confirmed.

Figure 8:
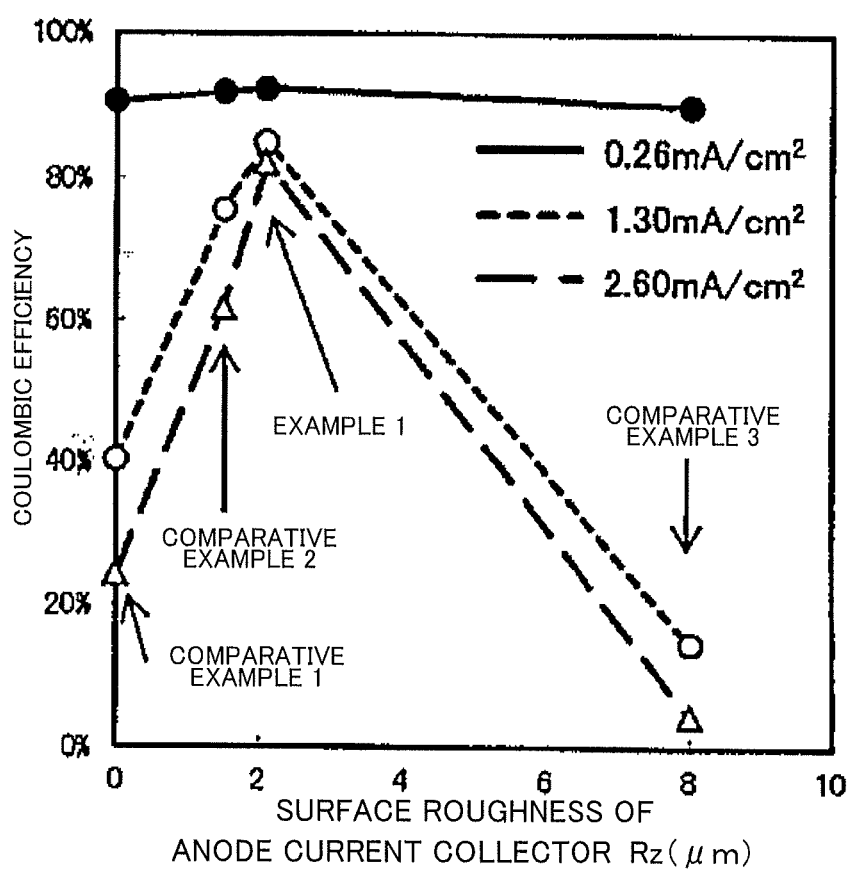
FIG. 8 illustrates coulombic efficiency of the evaluation batteries which are obtained in Example 1 and Comparative Examples 1 to 3.

Results of coulombic efficiency are illustrated in FIG. 8. As illustrated in FIG. 8, in Example 1, coulombic efficiency as high as 80% or greater was shown at any current density. According to this, it could be confirmed that the internal short-circuit hardly occurred. Particularly, in Example 1, even when the current density was raised, the coulombic efficiency was hardly decreased. On the other hand, in Comparative Examples 1 and 3, in a case of performing charging at a current density of 1.3 $mA/cm^2$ or greater, the coulombic efficiency was significantly decreased. In addition, in Comparative Example 2, in a case of performing charging at a current density of 1.3 $mA/cm^2$ or greater, a decrease in the coulombic efficiency was found, and occurrence of minute short-circuit was implicated. In addition, as illustrated in FIG. 8, in a case where $R_z$ was in a range of 1.8

μm to 2.5 μm, the coulombic efficiency was 80% or greater. As described above, when the surface roughness on an interface between the anode current collector and the solid electrolyte layer is too small or too large, the short-circuit tends to occur, and thus it was confirmed that it is possible to effectively suppress occurrence of the short-circuit in a very limited range.

REFERENCE SIGNS LIST

1: Anode current collector
2: Solid electrolyte layer
3: Cathode active material layer
4: Cathode current collector
5: Anode active material layer
6: Battery case
10: Solid lithium secondary battery
11: Laminated body

What is claimed is:

1. A solid lithium secondary battery, comprising an anode current collector, a solid electrolyte layer, a cathode active material layer, and a cathode current collector in this order,
wherein the solid electrolyte layer is provided on a surface of the anode current collector,
the solid electrolyte layer contains a sulfide solid electrolyte particle,
a surface shape of the solid electrolyte layer, which faces the anode current collector, is formed in correspondence with a surface shape of the anode current collector, and
10-point average roughness ($R_z$) of the surface of the anode current collector on a solid electrolyte layer side, and 10-point average roughness ($R_z$) of a surface of the solid electrolyte layer on an anode current collector side are in a range of 1.8 μm to 2.5 μm, respectively.

2. A solid lithium secondary battery, comprising an anode current collector, a solid electrolyte layer, a cathode active material layer, and a cathode current collector in this order,
wherein an anode active material layer, which is a Li metal that precipitated, is provided on a surface of the anode current collector on a solid electrolyte layer side,
the solid electrolyte layer contains a sulfide solid electrolyte particle,
a surface shape of the solid electrolyte layer, which faces the anode current collector, is formed in correspondence with a surface shape of the anode current collector, and
10-point average roughness ($R_z$) of the surface of the anode current collector on the solid electrolyte layer side, and 10-point average roughness ($R_z$) of a surface of the solid electrolyte layer on an anode current collector side are in a range of 1.8 μm to 2.5 μm, respectively.

3. A method of manufacturing a solid lithium secondary battery, comprising steps of:
a preparation process of preparing a laminated body comprising an anode current collector, a solid electrolyte layer, a cathode active material layer, and a cathode current collector in this order; and
a charging process of performing a charging treatment with respect to the laminated body,
wherein in the preparation process, a pressurization treatment is performed in a state in which at least the anode current collector and a material for formation of the solid electrolyte layer are disposed so as to transfer a surface shape of the anode current collector to a surface of the solid electrolyte layer that faces the anode current collector,
in the charging process, Li that is contained in the cathode active material layer is allowed to migrate toward an anode current collector side so as to form an anode active material layer, which is a Li metal that precipitated, on a surface of the anode current collector on a solid electrolyte layer side,
the solid electrolyte layer contains a sulfide solid electrolyte particle, and
10-point average roughness ($R_z$) of the surface of the anode current collector on the solid electrolyte layer side, and 10-point average roughness ($R_z$) of the surface of the solid electrolyte layer on the anode current collector side are in a range of 1.8 μm to 2.5 μm, respectively.

4. The solid lithium secondary battery according to claim 1, wherein the sulfide solid electrolyte particle contains at least one selected from the group consisting of $Li_2S$—$P_2S_5$, $Li_2S$—$P_2S_5$—$LiI$, $Li_2S$—$P_2S_5$—$LiCl$, $Li_2S$—$P_2S_5$—$LiBr$, $Li_2S$—$P_2S_5$—$Li_2O$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_n$ (in which, "m" and "n" represent a positive number, and Z represents any one of Ge, Zn, and Ga), $Li_2S$—$GeS_2$, $Li_2S$—$SiS_2$—$Li_3PO_4$, $Li_2S$—$SiS_2$-$Li_x$-$MO_y$, (in which, "x" and "y" represent a positive number, and M represents any one of P, Si, Ge, B, Al, Ga, and In), and $Li_{10}GeP_2S_{12}$.

5. The solid lithium secondary battery according to claim 2, wherein the sulfide solid electrolyte particle contains at least one selected from the group consisting of $Li_2S$—$P_2S_5$, $Li_2S$—$P_2S_5$—$LiI$, $Li_2S$—$P_2S_5$—$LiCl$, $Li_2S$—$P_2S_5$—$LiBr$, $Li_2S$—$P_2S_5$—$Li_2O$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_n$ (in which, "m" and "n" represent a positive number, and Z represents any one of Ge, Zn, and Ga), $Li_2S$—$GeS_2$, $Li_2S$—$SiS_2$—$Li_3PO_4$, $Li_2S$—$SiS_2$-$Li_x$-$MO_y$, (in which, "x" and "y" represent a positive number, and M represents any one of P, Si, Ge, B, Al, Ga, and In), and $Li_{10}GeP_2S_{12}$.

6. The solid lithium secondary battery according to claim 1, wherein the sulfide solid electrolyte particle has an ion conductor containing a $PS_4^{3-}$ structure.

7. The solid lithium secondary battery according to claim 2, wherein the sulfide solid electrolyte particle has an ion conductor containing a $PS_4^{3-}$ structure.

8. The solid lithium secondary battery according to claim 1, wherein the sulfide solid electrolyte particle comprises an ion conductor including a Li element, a P element and a S element.

9. The solid lithium secondary battery according to claim 2, wherein the sulfide solid electrolyte particle comprises an ion conductor including a Li element, a P element and a S element.

10. The solid lithium secondary battery according to claim 8, wherein the sulfide solid electrolyte particle comprises the ion conductor as a main body, and the ion conductor contains a $PS_4^{3-}$ structure.

11. The solid lithium secondary battery according to claim 9, wherein the sulfide solid electrolyte particle comprises the ion conductor as a main body, and the ion conductor contains a $PS_4^{3-}$ structure.

12. The solid lithium secondary battery according to claim 1, wherein a restriction pressure in a thickness direction is applied to the solid lithium secondary battery by a restriction member.

13. The solid lithium secondary battery according to claim 2, wherein a restriction pressure in a thickness direction is applied to the solid lithium secondary battery by a restriction member.

* * * * *